United States Patent Office 3,490,519
Patented Jan. 20, 1970

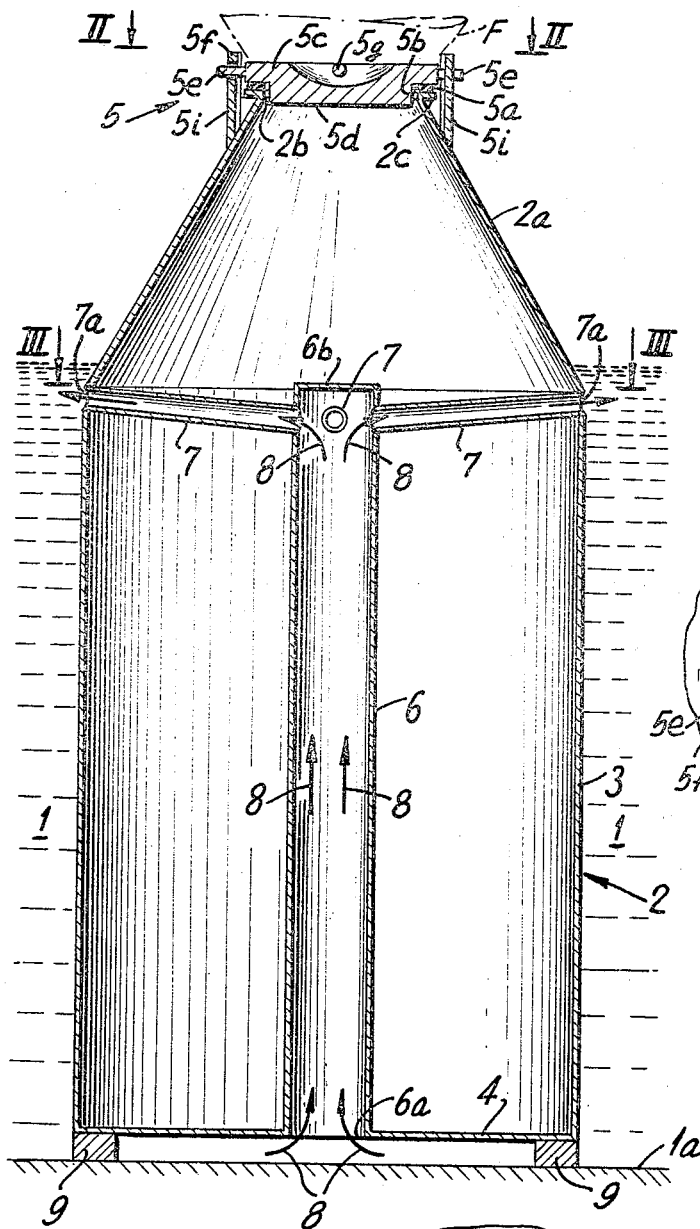
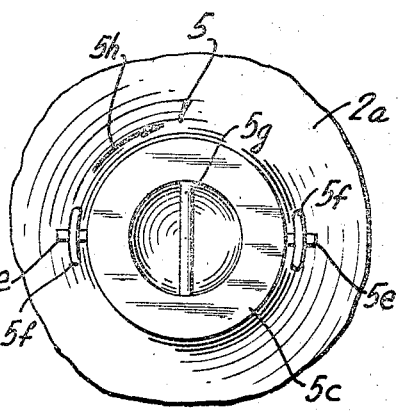
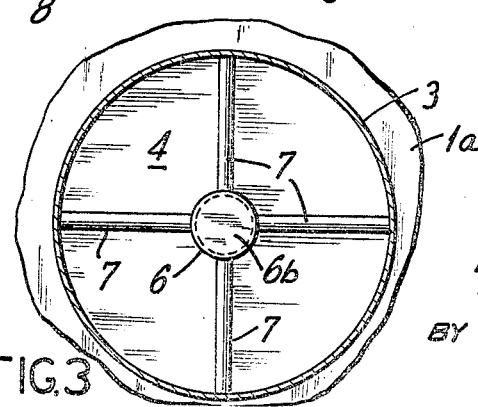

3,490,519
APPPARATUS FOR THE COOLING OF SPONGE IRON AND LIKE PRODUCTS OF A DIRECT-REDUCTION FURNACE
Heinz-Dieter Pantke, Essen-Frintrop, and Herbert Hickmann, Oberhausen, Germany, assignors to Firma Huttenwerk Oberhausen AG., Oberhausen, Germany, a corporation of Germany
Filed Dec. 22, 1966, Ser. No. 603,958
Claims priority, application Germany, Jan. 25, 1966, H 58,333
Int. Cl. F25d 3/00
U.S. Cl. 165—47      6 Claims

ABSTRACT OF THE DISCLOSURE

A device for the cooling of sponge iron produced by the direct reduction of iron ore with reducing gases comprising a substantially cylindrical container or receptacle at least partly immersed in water and having at its upper end a rapid-action closure for hermetically sealing the receptacle, an upstanding central tube in this receptacle cooperating with passages at the upper and lower ends thereof for establishing a convection current of water along the walls of the vessel and through this inner tube.

---

Our present invention relates to a cooling apparatus for the dissipation of the heat content of sponge iron and like solid materials which have been reacted at elevated temperatures with gas streams and, more particularly, for the cooling of sponge iron produced by the direct reaction of iron-oxide ores and reducing-gas mixtures containing carbon monoxide and hydrogen.

The direction reduction of iron-oxide ores in cyclonic or vortex reducing furnaces and in reducing columns or shaft furnaces is generally carried out by passing the particulate, granular or pelletized ore countercurrent to or in entrainment with a stream of a reducing gas consisting predominantly of carbon monoxide and hydrogen. In this manner, a direct solid/gas reaction is carried out to convert the iron oxide into substantially pure iron to remove the oxygen content of the ore as carbon dioxide and/or water vapor. The direct-reduction reaction is carried out at temperatures of at least 600° C. so that the resulting iron sponge is at this or a higher temperature and contains considerable sensible heat as determined by its heat capacity. The cooling of this material, which may be in a coherent or loosely-piled state depending upon the temperature of the reaction, has hitherto been a problem, largely as a result of the need to maintain the sponge iron free from any contact with the atmosphere. This latter point is of particular importance inasmuch as sponge irons produced by the direct-reduction process are pyrophoric and react with oxygen in the ambient atmosphere even at relatively low temperatures, without initiators and without external ignition, because of the extraordinarily high reactive surface area of the sponge iron. The auto-oxidation of the sponge iron increases in rapidity and degree with temperature so that the admission of any atmospheric oxygen to the sponge iron at temperatures at which it may emerge from the reducing furnace would convert a significant part of the iron back into its oxide.

There has been proposed heretofore a number of methods and devices for the cooling of sponge irons produced by the direct gas reduction of iron ores. One of these techniques involves so-called "cooling drums" having a horizontal or generally horizontal axis and a cylindrical configuration; the double walls of such drums form passages for a cooling liquid (e.g. water) while a screw or worm or like conveyor feeds the sponge iron through the drum from a furnace communicating therewith at one end. The cooling of sponge iron by this technique has the significant disadvantage that the product remains only for a relatively short period in the drum as a consequence of the large throughput and the proportionately large apparatus capacity which must be made available. The cost per unit weight of this cooling process is considerable and the requirement for mechanical movement of the hot sponge iron through the drum results in wear of the conveying means and large capital and replacement costs.

In an alternate method, it has been proposed to cool the sponge iron by directly immersing it in a water bath and thereafter removing the sponge-iron particles from the water. Direct cooling is carried out with considerable speed but is not ideal because purification of the water and capital and labor costs of removing the sponge iron from the water become highly signifiicant. Another factor which has lead to avoidance of the direct-immersion cooling of sponge iron is the high moisture content of the sponge iron withdrawn from the water bath, especially when the sponge iron is to be used directly or is to be stored. It frequently is necessary to dry the sponge iron before use, a process which adds considerably to the cost and utility of the cooling technique as a whole.

Just as the aforementioned prior-art systems have been found to be unsatisfactory, so, too, have workers concerned with the problem of cooling sponge iron avoided methods whereby containers of sponge iron were permitted to reach ambient temperature in contact with ore. It may be noted that these latter suggestions were characterized by a nonuniformity of cooling and even the absence of a cooling of the sponge iron in the central regions of the container. As a result any system of the latter type would have required, because of the slowness of the cooling process and the nonuniformity thereof, an inordinately large number of vessels.

It is the principal object of the present invention to provide a method of and device for the cooling of sponge iron and like oxidizable materials, as generated by the direct gas reduction of a metal ore, whereby the aforementioned disadvantages can be avoided and cooling carried out with rapidity and at a low cost, without the danger of oxidation of the product.

A further object of this invention is to provide an apparatus for the cooling of sponge iron which will eliminate wear of any conveying means and yet afford a high cooling rate.

These objects and others which will become apparent hereinafter are attained, in accordance with the present invention, by a method which involves the direct discharge from the ore-reduction furnace of a pyrophoric hot sponge iron into up-right general cylindrical receptacles having hermetically sealable mouths at their upper ends, hermetically sealing the containers upon the introduction of the reduced iron into the containers, and thereafter immersing the containers into a water bath. The cooling is carried out at least in part by establishing a convection current of the cooling liquid upwardly through the interior of the vessel, but out of direct contact with the sponge iron, and downwardly along the outer cylindrical walls, this convection current being facilitated advantageously by using a central tube open at the bottom or floor of the receptacle and drawing the cooling fluid from around the vessel when the bottom of the latter is spaced or elevated above the floor of the cooling tank.

The hermetic seal of the rapid-closure type precludes admission of ambient oxygen even during the closing step. While a single central tube through the interior of the vessel is preferred, we also contemplate the more uniform dissipation of the heat within the interior of the sponge-iron mass by providing a multiplicity of tubes upstanding from the floor of the vessel and extending through the interior thereof with clearance from other tubes and the walls of the vessel. Thus, the space around each tube can be filled with the sponge-iron mass which thus lies in heat-exchanging contact with the walls of the tube and vessel and is cooled by the passage of individual convection currents through each of these tubes.

At the upper ends of the tubes, we provide generally radially extending ducts opening at the cylindrical wall of the vessel for discharging the liquid stream passing through the interior of the tube. It will be understood that similar radial tubes can form the ducts communicating with the lower inlet sides of the tubes although a preferred construction provides that the tubes open at the bottom of the vessel and that this bottom is spaced above the floor of the tank as indicated earlier. When a single central tube are provided or a small number of tubes is used, the radial ducts at the upper or outlet end of each tube are preferably angularly equispaced therearound. Thus, when four radial discharge ducts are provided, they are spaced apart by 90° and preferably diverge upwardly and outwardly from their respective upright tubes to facilitate the induced flow of liquid through the system. It will be apparent that this arrangement eliminates all moving parts and completely obviates wear of any replaceable or expensive components; moreover, no problems arise from the recovery of the sponge iron from the water bath since, upon cooling, the vessels may be dumped into subsequent treatment apparatus without danger of pyrophoric ignition. Furthermore, the sponge iron can simply be stored in the vessels until use and, because the cooling rate is facilitated without fluid circulation means or the like and the circulation is induced without the need of pumps or other arrangements attached to the vessel, substantially fewer vessels are required for a given cooling capacity.

The above and other objects, features and advantages of the present invention will become more readily apparent from the following description, reference being made to the accompanying drawing in which:

FIG. 1 is an axial cross-sectional view through a device for the cooling of sponge iron in accordance with this invention;

FIG. 2 is a view taken along the line II—II of FIG. 1;

FIG. 3 is a cross section along the line III—III of FIG. 1; and

Figure 4:
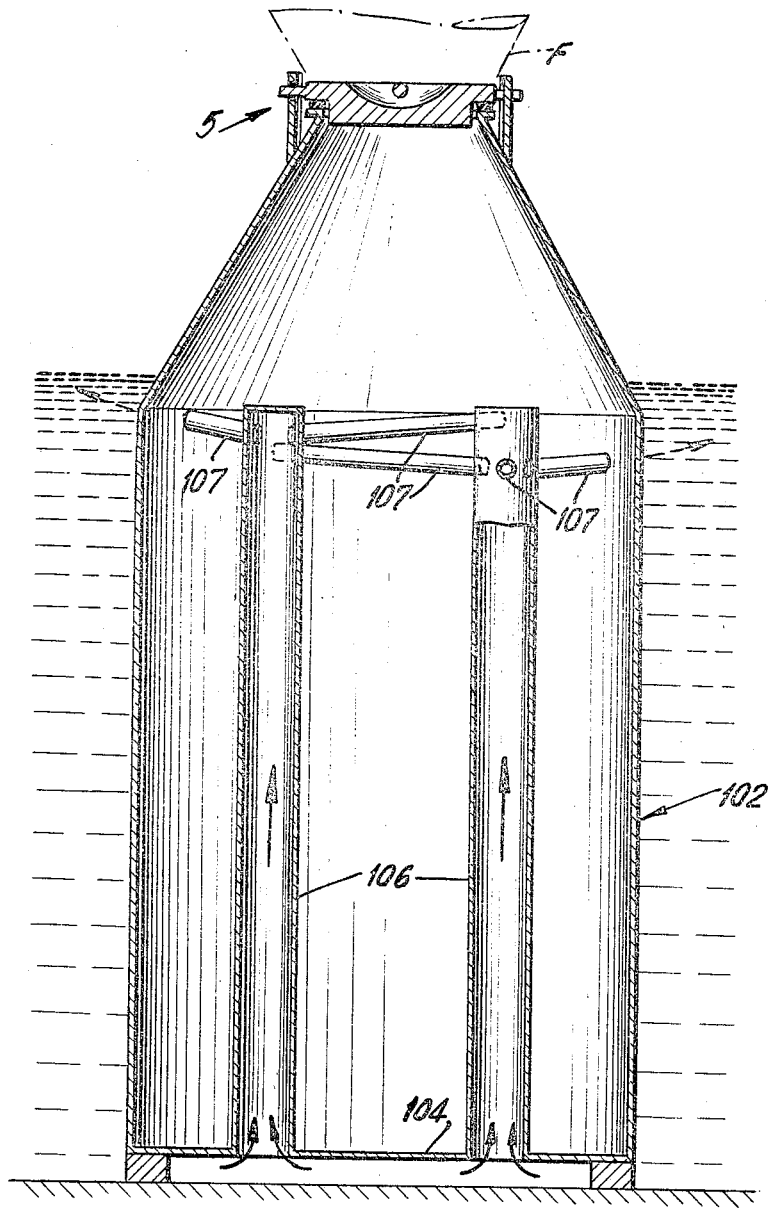
FIG. 4 is a view similar to FIG. 1 but illustrating another embodiment of this invention.

In FIGS. 1-3 of the drawing, we show a system for the cooling of a mass of sponge-iron particles or a relatively coherent accumulation thereof as may be derived from a cyclonic direct-reduction furnace F or a shaft furnace wherein the iron ore is passed countercurrent to a reducing gas stream. The device includes a generally cylindrical metallic container 2 whose cylindrical wall 3 is immersible substantially completely in a water bath 1 with the bottom 4 of the vessel 2 held above the floor 1a of the bath by legs or blocks 9 (FIG. 1). At its upper end, the container 2 is provided with a frustoconically convergent neck 2a whose mouth 2b is provided with a rapid-action hermetically sealing closure arrangement 5. The latter arrangement can include a packing ring 5a overlying the lip 2c of the mouth 2b of the container 2 and engageable with a sealing surface 5b of a cover 5c whose central boss 5d extends into and is centered by the mouth 2b of the vessel 2.

As can be seen in FIG. 2, the cover 5c is provided with laterally extending studs 5e which engage below overhanging lugs 5f in a bayonet connection upon rotation of the cover 5c—via a handle 5g—in the direction of the arrow 5h. The lugs 5f are carried by plates 5i welded upon the frustoconical portion 2a of the vessel 2 as illustrated in FIG. 1.

To permit a convection current of the cooling liquid to flow through the interior of the vessel 2, we provide a central (axially extending) upstanding pipe or tube 6 which opens at 6a at the bottom 4 of the vessel 2 to the surrounding water bath 1. The upper end of the tube 6 is closed at 6b and provided with a plurality (three or four) of outlet ducts 7, angularly equispaced about the central tube 6 as illustrated in FIG. 3. The ducts 7 are tubular, as can be seen from FIG. 1, and open into the water bath 1 at 7a, substantially at the upper end of the cylindrical portion 3 of the vessel 2. Moreover, to facilitate the upward and outward flow of the convection currents, the ducts 7 diverge upwardly and outwardly along respective radii of the cylindrical vessel 2.

The method of the present invention is carried out as follows:

A. At a location which may be remote from the water bath 1 and is diagrammatically represented here by the dot-dash lines F indicating the furnace chute or hopper, the vessel 2 is filled or substantially filled with the sponge-iron particles without admission of air. To this end, the discharge chute of the furnace F bears upon the seal 5a at the lip 2c of the mouth of the vessel 2.

B. Upon removal from the hopper F, the mouth 2b of the vessel 2 is closed by the bayonet-action rapid-acting cover 5c.

C. Upon the hermetic sealing of the vessel 2, it is removed from the reduction apparatus and immersed in the water bath 1 to a level such that the connection tubes or discharge ducts 7 open below the water level and a passage between the supports 9 for the convection current is formed beneath the bottom 4 of the vessel 2. The convection current passing in the direction of arrows 8 draws water from the bath 1 inwardly beneath the bottom 4 of the vessel 2 and upwardly through the central tube 6 whereupon the water is heated by the thermo-transfer through the wall of the tube 6. Thereafter, the heated water flows through the discharge ducts 7 into the bath 1 and the flow continues as long as the temperature of the mass within the vessel 2 exceeds the temperature of the bath. Concurrently, the water contacting walls 3 of the vessel 2 cools the mass in contact therewith. The proximity of the cooling surfaces 3 and 6 to the most remote regions of the sponge-iron mass increases the rate at which the mass is cooled and the uniformity of the cooling.

In FIG. 4, we show a modified system wherein a plurality of tubes 106 extends upwardly from the floor 104 of the vessel 102, each of these tubes 106 having outwardly extending discharge ducts 107 angularly equispaced therearound. A rapid-acting closure 5 is provided for the mouth of this vessel 102 in the manner described with respect to FIG. 1.

We have discovered that certain parameters should be observed for most effective operation of the device of the present invention and are indeed to be considered important for the effectiveness and economy thereof. Thus, the total volume of the tube 6 within the vessel 2 should not exceed 2.5% of the cpaacity of the vessel (and preferably should range between 1 and 2.5%). Of even greater significance are the restrictions as to the tubes themselves and it has been found to be important that the diameter of the central tube 6 or the upstanding tubes 106 not exceed 20% of the diameter of the cylindrical portion of the vessel nor be less than 5% of this diameter. When a plurality of upright tubes are provided, the flow cross section of all the upstanding pipes may range up to 4% of the cross-sectional area of the vessel. Best results are obtained when, however, the diameter of the single central upstanding pipe ranges between 10 and 15% of the diameter of the cylindrical receptacle. The tube 6, moreover, should range in axial height between 60 and 90% (preferably 70 to 80%) of the height of the vessel 2. The ducts 7 connected with each tube 6 can have lesser diameters than the upright tube into which they open and preferably diameters ranging between 40 and 70% of the diameters of their respective upright tubes. At any rate, the flow cross section of the tubes 7 should be equal to that of the respective tubes 6.

We claim:
1. An apparatus for cooling sponge iron, comprising a water bath and a generally cylindrical upright vessel with thermally conductive walls removably immersed in said bath; said vessel having a bottom, spacer means maintaining a clearance between said bottom and the floor of said bath, at least one tube rising from said bottom while opening into said clearance, and conduit means laterally extending from the top of said tube through said walls for enabling circulation of water from said bath by way of said tube, said vessel converging generally frustroconically above said conduit means toward an inlet having a lip adapted to be fitted onto a furnace outlet, said lip being provided with closure means for hermetically sealing said inlet upon a filling of said vessel with hot sponge iron from said furnace.

2. An apparatus as defined in claim 1 wherein said conduit means comprises a plurality of angularly spaced outlet ducts opening into said water bath below the surface thereof.

3. An apparatus as defined in claim 2 wherein said tube is disposed centrally within said vessel.

4. An apparatus as defined in claim 3 wherein said tube has a diameter ranging between substantially 5 and 20% of the diameter of said vessel, said tube having an axial height of substantially 60 to 90% of the height of said vessel, said ducts each having a diameter between substantially 40 and 70% of the diameter of said tube and a collective flow cross-section substantially equal to that of said tube.

5. An apparatus as defined in claim 4 wherein the diameter of said tube ranges between 10 and 15% of the diameter of said vessel and the height of said tube ranges between 70% and 80% of the height of said vessel, at least three of said outlet ducts being provided.

6. An apparatus as defined in claim 2 wherein said ducts are inclined upwardly and outwardly from said tube.

References Cited

UNITED STATES PATENTS 1,854,169    4/1932    Fryhofer _____ 165—108

ROBERT A. O'LEARY, Primary Examiner

C. SUKAL, Assistant Examiner

U.S. Cl. X.R.

165—108